R. Kitson.
Card Clothing.
Nº 21,685.   Patented Oct. 5, 1858.
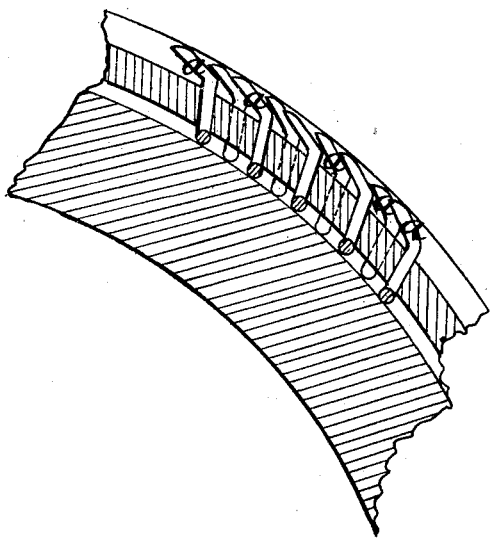

UNITED STATES PATENT OFFICE.

RICHARD KITSON, OF LOWELL, MASSACHUSETTS.

IMPROVEMENT IN CARD-CLOTHING.

Specification forming part of Letters Patent No. 21,685, dated October 5, 1858.

*To all whom it may concern:*

Be it known that I, RICHARD KITSON, of Lowell, in the county of Middlesex and State of Massachusetts, have invented a new and useful Improvement in Card-Clothing for Ginning Cotton and Burring Wool; and I do hereby declare that the following is a full, clear, and exact description of the same, reference being had to the accompanying drawing, forming part of this specification, said drawing representing a section taken transversely to the axis of a portion of the cylinder of a cylinder cotton-gin or a wool-burring machine. The teeth in this view are somewhat enlarged to exhibit their construction more plainly.

This invention consists in so forming the pointed teeth of card-clothing for cotton-gins and wool-burring machines that when the clothing is wound upon a cylinder or fastened to an endless belt the points will be below the thick parts of the wires, and the thick parts of the wires, which constitute the heels of the teeth, will form smooth surfaces for the seeds or burrs to roll upon, and thus prevent the latter from coming in contact with and being broken by the points, and also prevent the damage which the teeth would receive by their points coming in contact with the seeds or burrs. By this means the only objections to the use of toothed surfaces for ginning cotton and burring wool—viz., the breaking of the seeds or burrs and the liability of the teeth to be rendered useless by coming in contact with the seeds or burrs—are overcome.

To explain the invention in the clearest possible manner, I have described in red color in the drawing from the center of the cylinder an arc of a circle which touches the highest parts of the teeth. It will be seen by reference to this that the points of the teeth $a\,a$ are considerably within this arc.

In carrying out my invention I prefer to make the teeth with sharp though short points, as represented.

The teeth in other respects than those I have mentioned are constructed in the same manner as the pointed teeth commonly used for pickers and coarse carding-machines and other purposes, and the ginning and burring machines in which they are applied may be the same as have been heretofore constructed with toothed surfaces for similar purposes, or of any other suitable construction, a guard, either revolving or stationary, being employed to drive back the seeds or burrs into a hopper as soon as they are liberated by the action of the teeth.

What I claim as my invention, and desire to secure by Letters Patent, is—

Constructing the teeth so that when in place their points are below or less prominent than and protected and guarded by their thick parts or heels, substantially as and for the purpose herein specified.

RICHARD KITSON.

Witnesses:
D. S. RICHARDSON,
JOSHUA CONVERSE.